(12) United States Patent
Lin

(10) Patent No.: US 12,451,165 B2
(45) Date of Patent: Oct. 21, 2025

(54) ACCOMMODATING DEVICE, HOST AND DATA PROCESSING EQUIPMENT

(71) Applicant: Fulian Precision Electronics (Tianjin) Co., LTD., Tianjin (CN)

(72) Inventor: Ke-Cheng Lin, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 198 days.

(21) Appl. No.: 18/494,086

(22) Filed: Oct. 25, 2023

(65) Prior Publication Data

US 2024/0363149 A1   Oct. 31, 2024

(30) Foreign Application Priority Data

Apr. 26, 2023   (CN) .......................... 202310464945.8

(51) Int. Cl.
*H05K 5/03* (2006.01)
*G11B 33/02* (2006.01)
*H05K 5/02* (2006.01)

(52) U.S. Cl.
CPC .......... *G11B 33/022* (2013.01); *H05K 5/0221* (2013.01); *H05K 5/03* (2013.01)

(58) Field of Classification Search
None
See application file for complete search history.

(56) References Cited

U.S. PATENT DOCUMENTS

| | | | | |
|---|---|---|---|---|
| 7,019,965 B2* | 3/2006 | Bradley | .................. | G06F 1/187 |
| | | | | 361/679.38 |
| 9,282,674 B2* | 3/2016 | Li | .......................... | H05K 7/1487 |
| 11,632,869 B2* | 4/2023 | Wang | ...................... | G06F 1/185 |
| | | | | 312/223.2 |
| 11,703,919 B1* | 7/2023 | Zhong | .................. | H05K 7/1487 |
| | | | | 361/759 |
| 2005/0111178 A1* | 5/2005 | Bradley | ............... | H05K 7/1411 |
| | | | | 360/99.06 |

FOREIGN PATENT DOCUMENTS

TW           201506919 A       2/2015

* cited by examiner

Primary Examiner — Xanthia C Relford
(74) Attorney, Agent, or Firm — ScienBiziP, P.C.

(57) ABSTRACT

An accommodating device includes a housing defining a receiving space for receiving a component, two sliding locks arranged at intervals in the receiving space in a first direction, and a rotary lock connected to the sliding locks and configured to fix positions of the sliding locks. At least one of the sliding locks includes a stopper for being inserted into the component. Each of the sliding locks is slidably connected to the housing to realize the sliding locks approaching each other to insert the stopper into the component to fix the component or moving away from each other in the first direction to release the component. A host having the accommodating device and a data processing equipment having the host are also provided.

20 Claims, 9 Drawing Sheets

ACCOMMODATING DEVICE, HOST AND DATA PROCESSING EQUIPMENT

FIELD

The subject matter herein generally relates to an accommodating device, a host having the accommodating device, and a data processing equipment having the host.

BACKGROUND

The hard disk is usually fixed in the housing by screws. Tools are required to lock the screws during assembly and remove the screws before or during the maintenance, resulting in low efficiency of assembly and maintenance, which is not conducive to production.

Therefore, there is room for improvement within the art.

BRIEF DESCRIPTION OF THE DRAWINGS

Implementations of the present disclosure will now be described, by way of embodiments, with reference to the attached figures.

DETAILED DESCRIPTION

Figure 1:
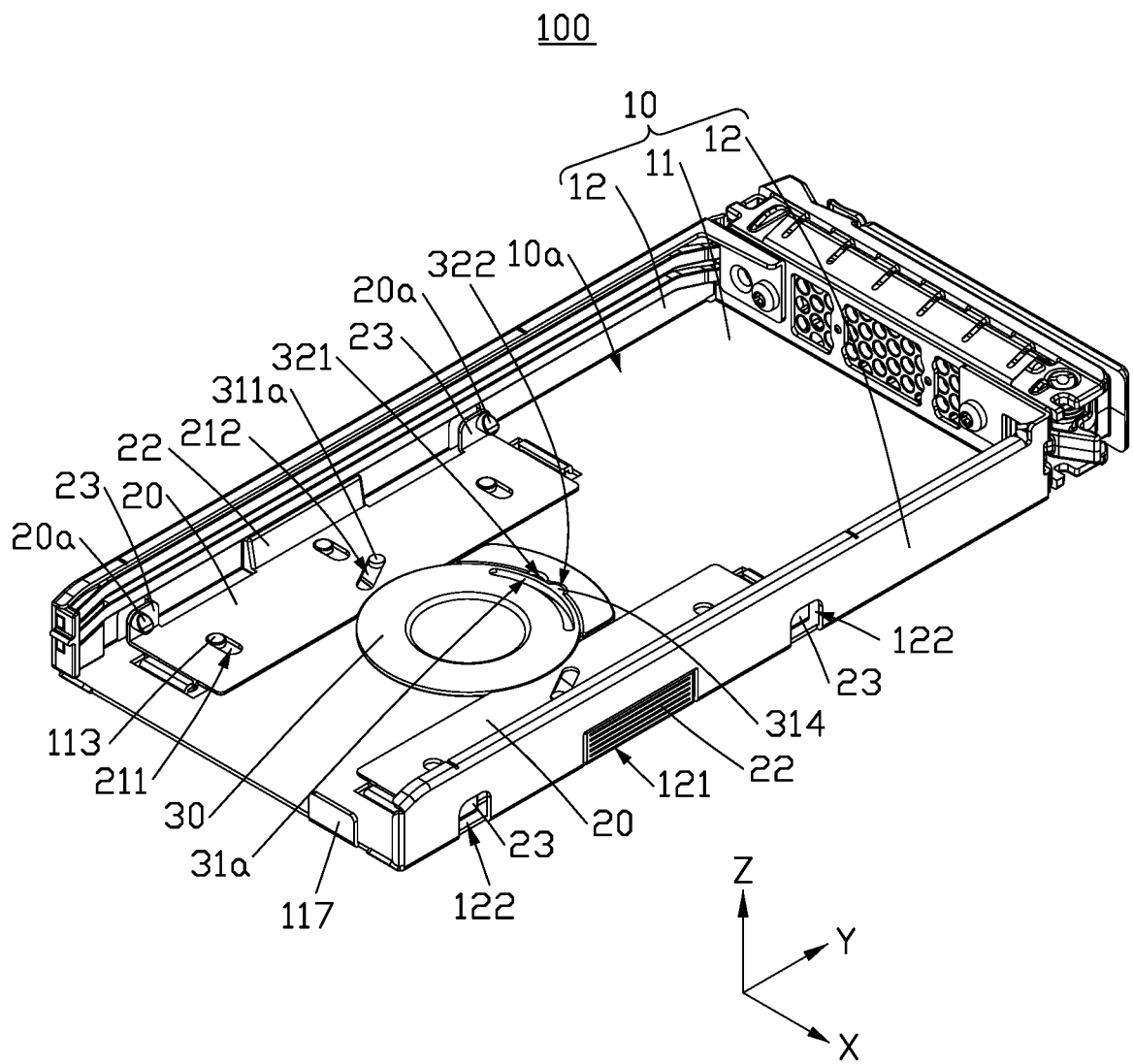
FIG. 1 is a schematic diagram illustrating an accommodating device according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

FIG. 1 illustrates an embodiment of an accommodating device 100. Referring to FIG. 1, the accommodating device 100 includes a housing 10, two sliding locks 20, and a rotary lock 30. The housing 10 defines a receiving space 10a to receive a component 300 (shown in FIG. 7). The sliding locks 20 are arranged at intervals in the receiving space 10a in a first direction X, and each of the sliding locks 20 is slidably connected to the housing 10 to realize the sliding locks 20 approaching or moving away from each other in the first direction X to fix or release the component 300. At least one of the sliding locks 20 includes a stopper 20a. The rotary lock 30 is connected to the sliding locks 20 and configured to fix positions of the sliding locks 20, so that the sliding locks 20 can keep a state of fixing the component 300 or keep a state of releasing the component 300. When the sliding locks 20 approach each other in the first direction X, the stopper 20a is driven into the housing 10 and inserted into the component 300 to fix the component 300. When the sliding locks 20 move away from each other in the first direction X, the stopper 20a is driven withdraw from the housing 10 and the component 300 is released.

The above-mentioned accommodating device 100 fixes the component 300 or releases the component 300 by sliding the sliding locks 20, and the sliding locks 20 are kept in the state of fixing the component 300 or in the state of releasing the component 300 by rotating the rotary lock 30, so as to improve the efficiency of the fixing component 300 and the releasing and removing the component 300, which is beneficial to improve production efficiency.

In at least one embodiment, each of the sliding locks 20 may include the stopper 20a, which improves the stability of the component 300 when the component 300 is fixed.

Figure 2:
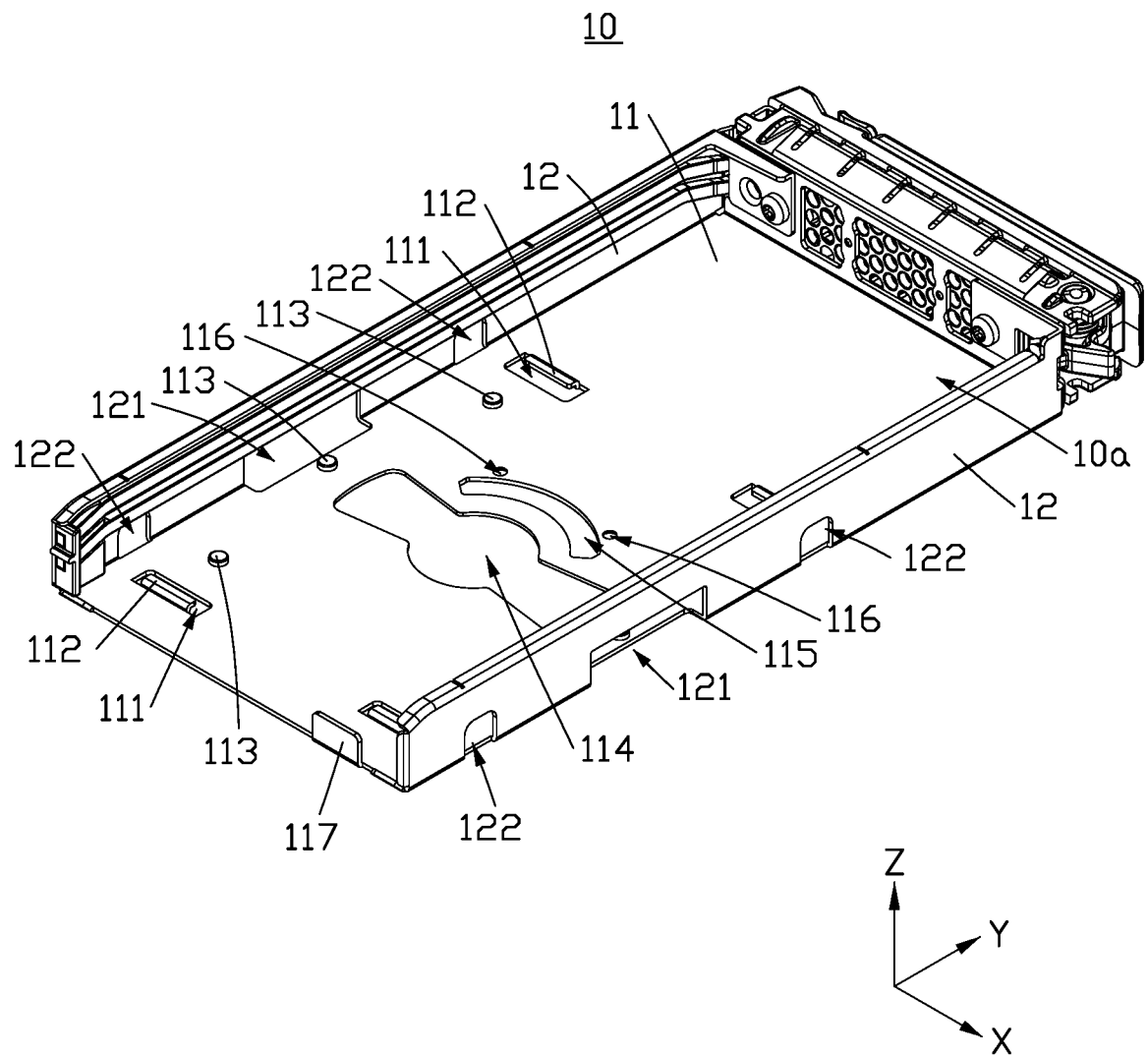
FIG. 2 is a schematic diagram illustrating a housing according to an embodiment of the present disclosure.

Referring to FIG. 1 and FIG. 2, in at least one embodiment, the housing 10 may include a bottom wall 11 and two side walls 12, the side walls 12 are arranged at intervals in the first direction X and each of the side walls 12 is connected to the bottom wall 11. The side walls 12 and the bottom wall 11 defines the receiving space 10a for receiving the component 300.

In at least one embodiment, a first opening 121 is defined by each of the side walls 12 and the first opening 121 extends through the corresponding side wall 12 in the first direction X. A part of the sliding lock 20 adjacent to the side wall 12 is slidably received in the first opening 121 of the adjacent side wall 12 along the first direction X to protrude out of the housing 10 or be retracted into the housing 10. When the parts of the sliding locks 20 protrude out of the housing 10, the sliding locks 20 can be driven to move toward each other by pressing the parts of the sliding locks 20 to fix the component 300. When the parts of the sliding locks 20 are retracted into the housing 10, the sliding locks 20 can be driven to move away from each other by pulling the parts of the sliding locks 20 to release the component 300.

In at least one embodiment, the first opening 121 may be defined by each of the side walls 12 and the bottom wall 11.

That is, a part of the first opening 121 may be defined by the side wall 12, the other part of the first opening 121 may be defined by the bottom wall 11.

In at least one embodiment, a second opening 122 may be defined by each of the side walls 12 and the second opening 122 may extend through the corresponding side wall 12 in the first direction X. The second opening 122 is used for passing the stopper 20*a* when the sliding locks 20 slide. In at least one embodiment, a part of the stopper 20*a* adjacent to the side wall 12 may be slidably received in the second opening 122 of the adjacent side wall 12 along the first direction X to protrude out of the second opening 122 or be retracted into the second opening 122. When the parts of the sliding locks 20 protruding out of the housing 10 is pressed, the stopper 20*a* is driven to protrude out of the second opening 122 to fix the component 300. When the parts of the sliding locks 20 is pulled from the housing 10, the stopper 20*a* is driven to retract into the second opening 122 to release the component 300.

In at least one embodiment, the second opening 122 may be recessed inwardly from a surface of one of the side walls 12 facing another of the side walls 12, and the second opening 122 may be a blind hole.

In at least one embodiment, two third openings 111 corresponding to each of the sliding locks 20 are defined by inner surfaces of the bottom wall 11 and arranged at intervals in a second direction Y perpendicular to the first direction X. Each of the third openings 111 extends through the bottom wall 11 in a third direction Z. The third direction Z is perpendicular to the first direction X and the second direction Y. A fixing portion 112 is connected to each of the inner surfaces of the bottom wall 11. Along the second direction Y, a width of the fixing portion 112 may be less than a width of the corresponding third opening 111. Each of the sliding locks 20 includes two first extending portions 20*b* arranged at intervals in the second direction Y. Each of the first extending portions 20*b* corresponds to one of the third openings 111 and is locked under the fixing portion 112 in the third direction Z, thereby fixing the sliding locks 20 to the bottom wall 11. Along the first direction X, each of the first extending portions 20*b* can slide relative to the fixing portion 112. In at least one embodiment, along the second direction Y, the width of the fixing portion 112 may be less than half of the width of the corresponding third opening 111, which is convenient for disposing the first extending portion 20*b* below the fixing portion 112 to abut against the fixing portion 112 in the third direction Z, and facilitating sliding of the first extending portion 20*b* relative to the fixing portion 112.

In at least one embodiment, at least one first protrusion 113 adjacent to each of the side walls 12 is provided on the bottom wall 11. Each first protrusion 113 is slidably connected to the sliding lock 20 and is configured to limit a sliding distance of the sliding lock 20 in the first direction X.

In at least one embodiment, a fourth opening 114 and a fifth opening 115 may be respectively defined by the bottom wall 11 and may respectively extend through the bottom wall 11 in the third direction Z. A first connecting hole 116 may be defined by the bottom wall 11, and the first connecting hole 11 may extend through the bottom wall 11 in the third direction Z.

In at least one embodiment, the bottom wall 11 may be provided with a positioning plate 117. The positioning plate 117 is connected to an edge of the bottom wall 11 and located between the side walls 12 to position the position of the component 300 in the second direction Y, so as to facilitate the accurate insertion of the stopper 20*a* within the component 300.

In at least one embodiment, the accommodating device 100 may further include an elastic member (not shown). The elastic member is received in the receiving space 10*a* and connected to at least one of the side walls 12. The elastic member is configured to limit a position of the component 300 in the receiving space 10*a* along the first direction X, which is beneficial for fixing the component 300. The elastic member may be a spring, a rubber or a sponge.

Figure 3:
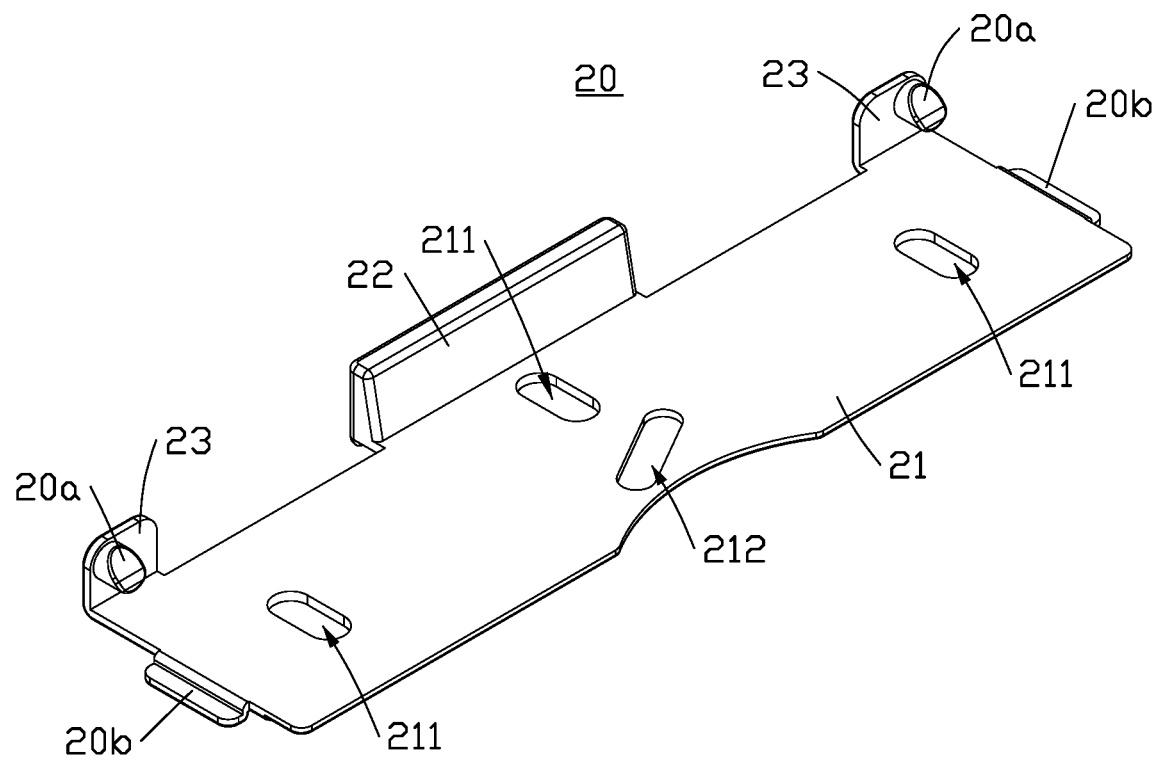
FIG. 3 is a schematic diagram illustrating a sliding lock according to an embodiment of the present disclosure.
Figure 4:
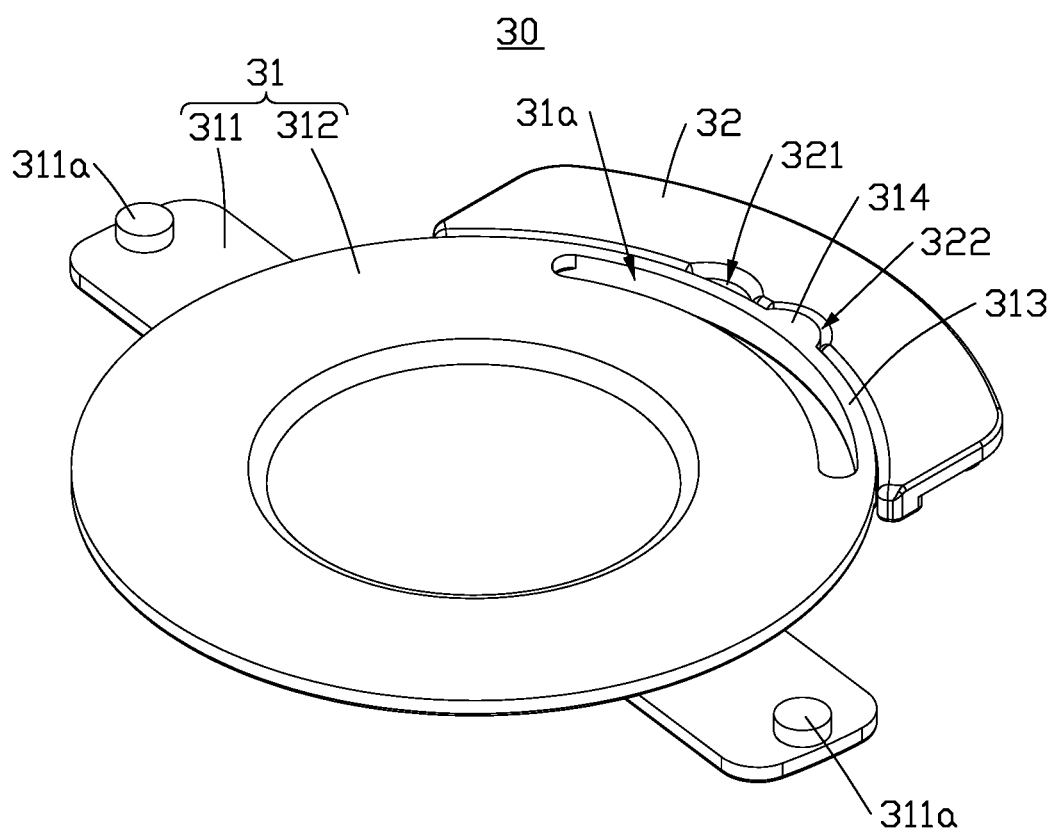
FIG. 4 is a schematic diagram illustrating a rotary lock according to an embodiment of the present disclosure.
Figure 5:
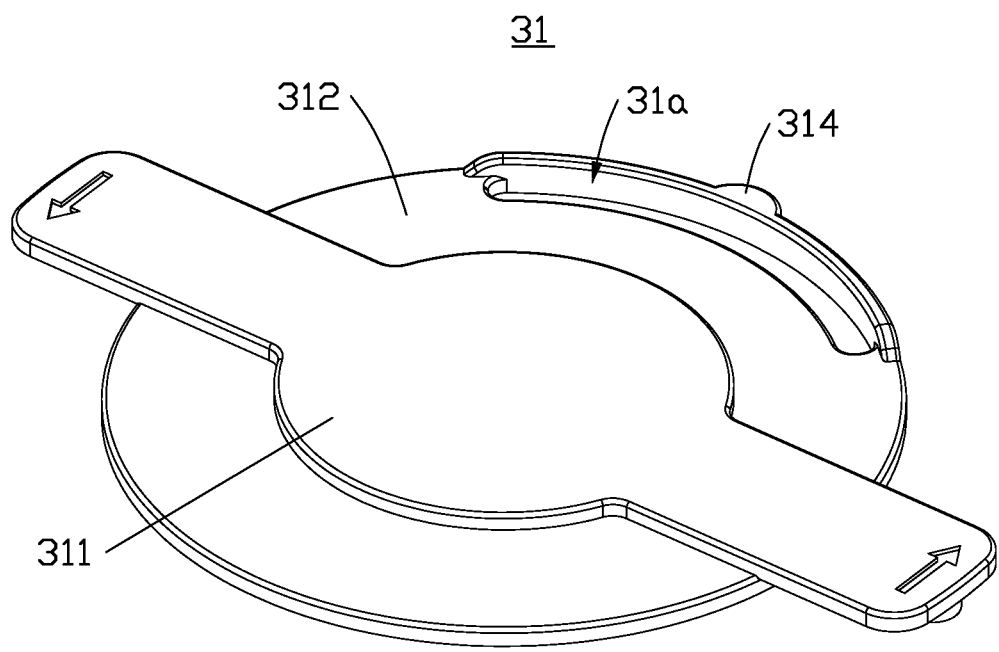
FIG. 5 is a schematic diagram illustrating the rotary lock from another angle according to an embodiment of the present disclosure.

Referring to FIG. 1, FIG. 2, and FIG. 3, in at least one embodiment, each of the sliding locks 20 may further include a first portion 21. The stopper 20*a* is connected to the first portion 21. The first extending portions 20*b* is connected opposite ends of the first portion 21 spaced apart along the second direction Y. At least one first through hole 211 is provided on the first portion 21 and may extend through the first portion 21 in the third direction Z. Each of the at least one first protrusion 113 is received in one of the at least one first through hole 211, and the first protrusion 113 can slide in the first through hole 211 in the first direction X. The first protrusion 113 cooperates with the first through hole 211 to limit the sliding distance of the sliding lock 20 in the first direction X. In at least one embodiment, the first through hole 211 may be a strip-shaped hole.

In at least one embodiment, a second through hole 212 is provided on the first portion 21 and may pass through the first portion 21 in the third direction Z. An extending direction of the second through hole 212 is inclined relative to the first direction X. The extending direction of the second through hole 212 of one of the sliding locks 20 is the same with the extending direction of the second through hole 212 of another one of the sliding locks 20.

In at least one embodiment, each of the sliding locks 20 may further include a second portion 22 connected to a side of the first portion 21 close to the adjacent side wall 12. The second portion 22 is the part of the sliding lock 20 slidably received in the first opening 121 of the adjacent side wall 12 along the first direction X to protrude out of the housing 10 or be retracted into the housing 10.

In at least one embodiment, each of the sliding locks 20 may further include a third portion 23 protruding from the first portion 21 along the third direction Z. The stopper 20*a* protruding from the third portion along the first direction X. The second opening 122 is used for passing the third portion 23 when the sliding locks 20 slide.

In at least one embodiment, at least one fixing hole (not shown) is provided on the component 300 for receiving the stopper 20*a*.

In at least one embodiment, two third portions 23 may be provided on each first portion 21. Along the second direction Y, the second portion 22 may be located between the third portions 23 in the same sliding lock 20.

Referring to FIG. 1, FIG. 2, FIG. 4, and FIG. 5, in at least one embodiment, the rotary lock 30 includes a rotary portion 31 and a positioning portion 32. The rotary portion 31 is rotatably connected to the bottom wall 11. The positioning portion 32 is fixedly connected to the bottom wall 11.

The rotary portion 31 includes a rotary body 311 rotatably mounted in the fourth opening 114. The fourth opening 114 limits a rotation angle of the rotary body 311. A part of the rotary body 311 may be located on a side of the first portion 21 facing the bottom wall 11. Two limiting protrusions 311*a* are provided on the rotary body 311, and each of the limiting protrusions 311*a* is slidably received in the second through hole 212 of one of the sliding locks 20. The movement of the sliding locks 20 drives the limiting protrusions 311 to slide in the second through holes 212 along the extending direction to drive the rotary body 311 to rotate.

In at least one embodiment, the rotary portion 31 may further include a connecting part 312 and an elastic part 313. The connecting part 312 is connected to the rotary body 311 to be mounted on the bottom wall 11. The elastic part 313 is connected to a side of the connecting part 312 facing the positioning portion 32. A second protrusion 314 is connected to a side of the elastic part 313 facing the positioning portion 32.

In at least one embodiment, the positioning portion 32 is connected to the bottom wall 11 through the first connecting hole 116. A first recess 321 and a second recess 322 are respectively recessed inwardly from a side of the positioning portion 32 facing the rotary portion 31, and the first recess 321 and the second recess 322 are arranged at intervals in the first direction X for receiving the second protrusion 314 to fix the positions of the sliding locks 20 to keep the state of fixing the component 300 or keep the state of releasing the component 300. When the sliding locks 20 approach each other in the first direction X or move away from each other in the first direction X, the rotary body 311 is driven to rotate by the limiting protrusions 311a to drive the connecting part 312 and the elastic part 313 to rotate, thereby driving the second protrusion 314 to rotate to switch between the first recess 321 and the second recess 322, so that the positions of the sliding locks 20 are fixed to keep the state of fixing the component 300 or keep the state of releasing the component 300.

In at least one embodiment, a gap 31a is provided between the connecting part 312 and the elastic part 313 to provide a deformation space for the elastic part 313 to facilitate the rotation of the second protrusion 314 between the first recess 321 and the second recess 322.

Figure 6:
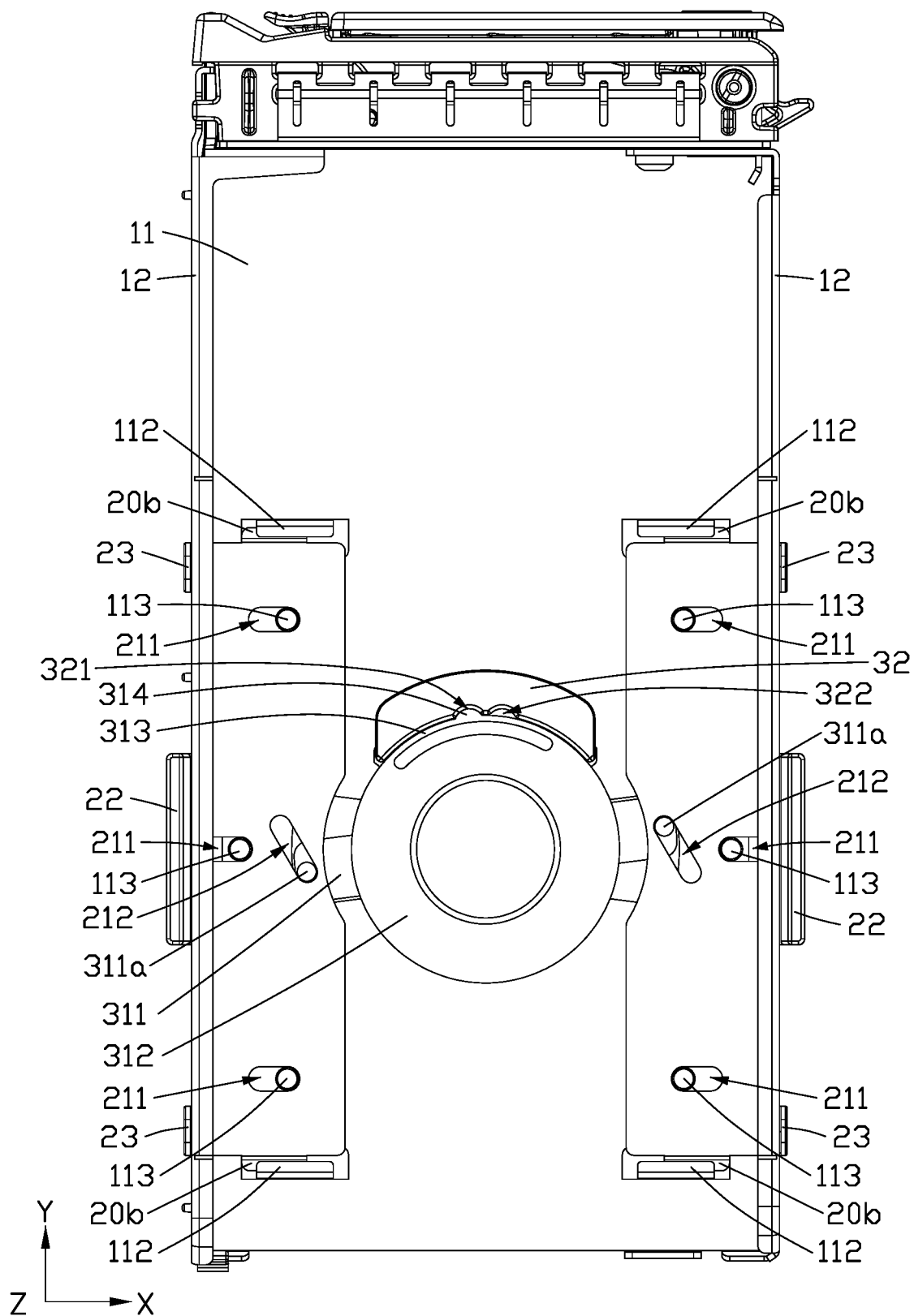
FIG. 6 is a schematic diagram illustrating an accommodating device in one state according to an embodiment of the present disclosure.

Referring to FIG. 6, in at least one embodiment, when the sliding locks are kept in the state of releasing the component 300, the second protrusion 314 may be in the first recess 321, the second portions 22 and the third portions 23 may protrude out of the housing 10, the stopper 20a may be received in the second opening 122. At this time, the component 300 can be taken out from the receiving space 10a for maintenance and replacement, or the component 300 can be placed in the receiving space 10a for assembly.

Figure 7:
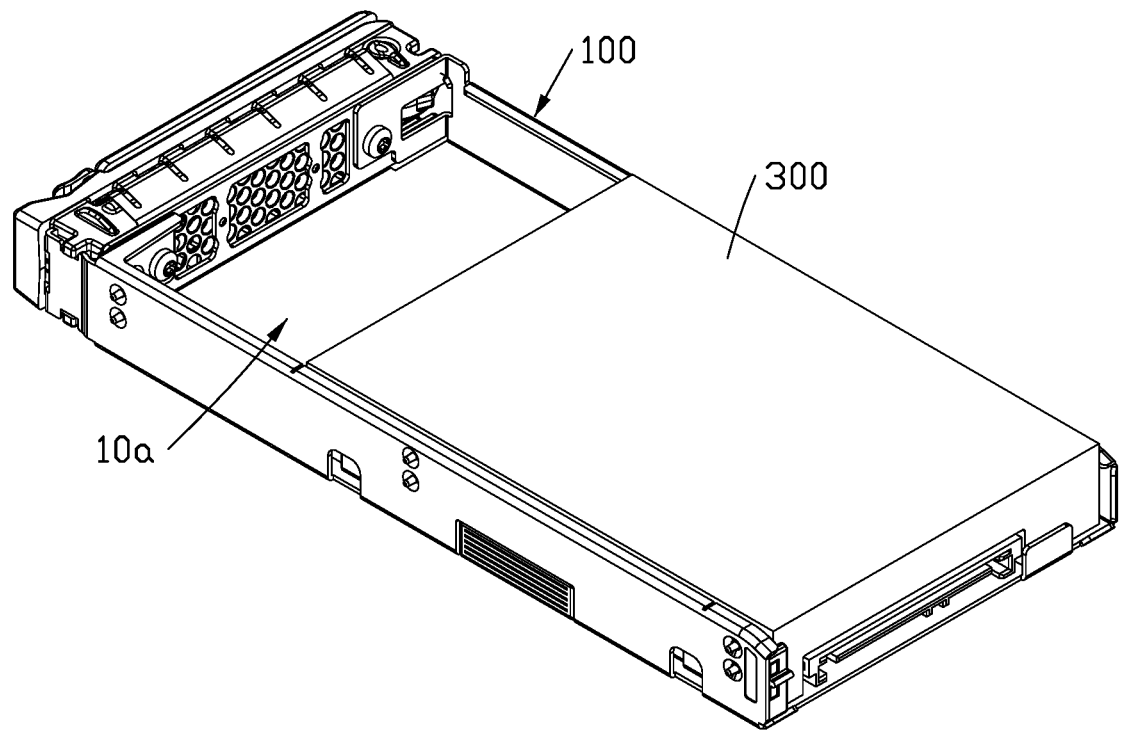
FIG. 7 is a schematic diagram illustrating an accommodating device in another state according to an embodiment of the present disclosure.

Referring to FIG. 1 and FIG. 7, in at least one embodiment, when the sliding locks are kept in the state of fixing the component 300, the second protrusion 314 may be in the second recess 322, the second portions 22 and the third portions 23 may be retracted into the housing 10, the stopper 20a may protrude into the receiving space 10a to be inserted into the component 300 to fix the component 300.

When the above-mentioned accommodating device 100 is in use, firstly, the second portions 22 of the sliding locks 20 are pulled from the housing 10, the sliding locks 20 move away from each other until the second protrusion 314 is disengaged from the second recess 322 and embedded in the first recess 321. After placing the component 300 i in the receiving space 10a, the second portions 22 of the sliding locks 20 are pushed into the housing 10, the sliding locks 20 move toward each other until the second protrusion 314 is disengaged from the first recess 321 and embedded in the second recess 322, and at this time, the stopper 20a is inserted into the component 300 to fix the component 300. When the component 300 needs to be taken away from the receiving space 10a, the second portions 22 of the sliding locks 20 are pulled from the housing 10 until the second protrusion 314 is disengaged from the second recess 322 and embedded in the first recess 321, then the component 300 can be taken away.

Figure 8:
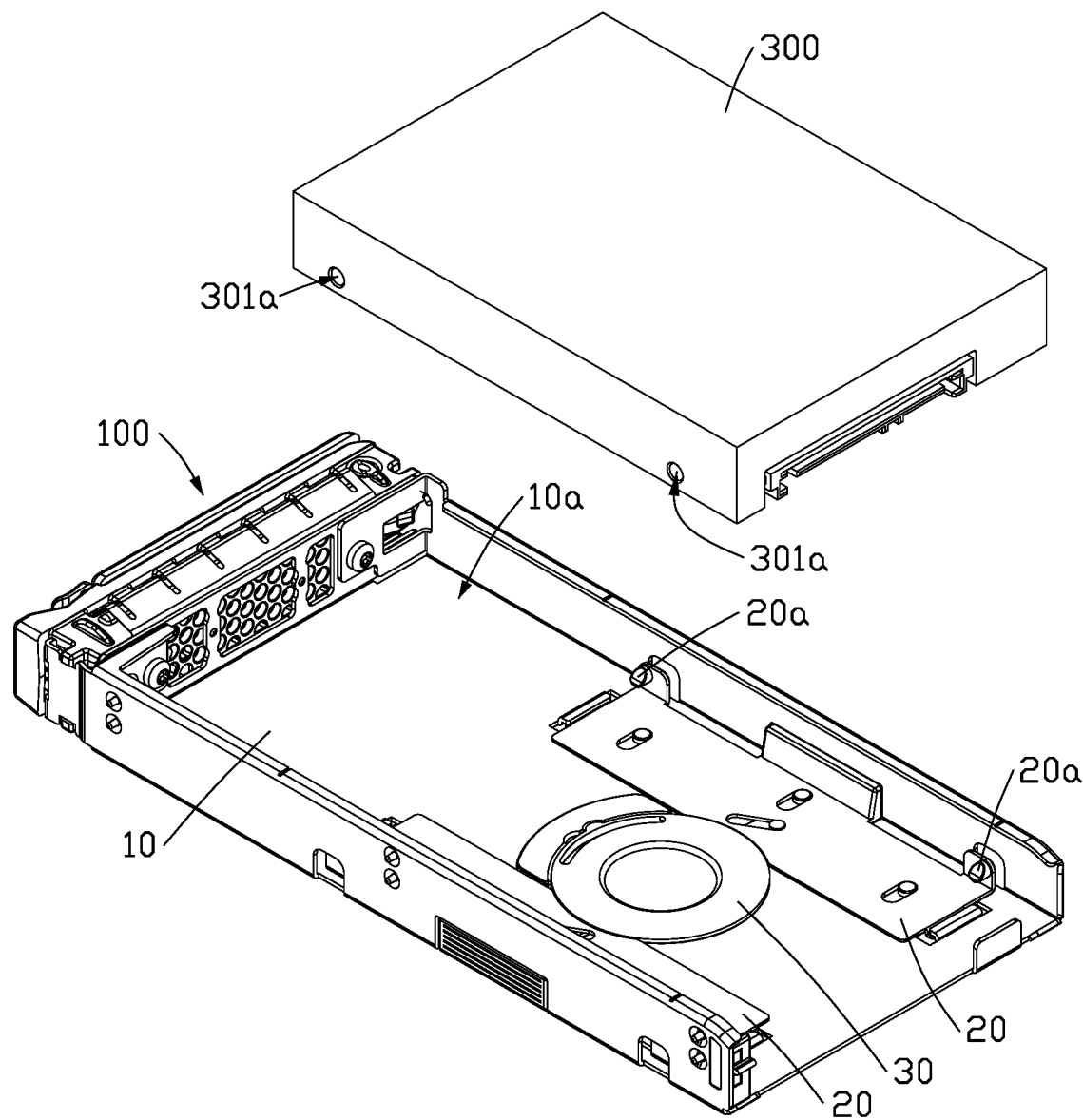
FIG. 8 is an exploded, diagrammatic view illustrating an accommodating device and a component according to an embodiment of the present disclosure.
Figure 9:
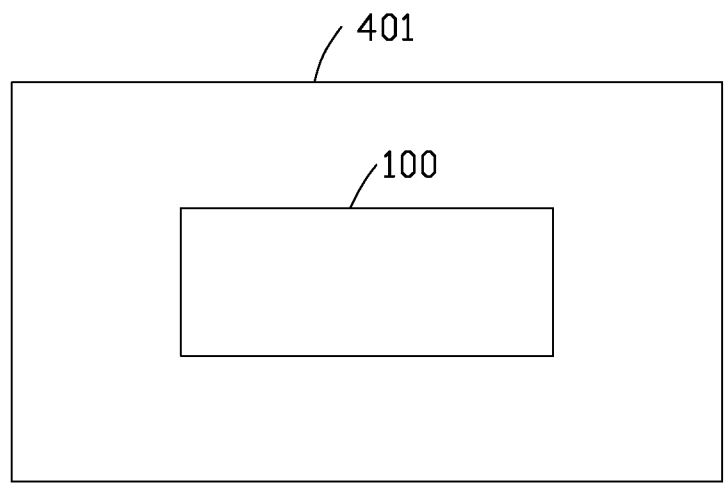
FIG. 9 is a schematic diagram illustrating a host according to an embodiment of the present disclosure.

FIG. 9 illustrates an embodiment of a host 400. The host 400 includes a cabinet 401 and the accommodating device 100. Referring FIG. 7, FIG. 8, and FIG. 9, the accommodating device 100 is received in the cabinet 401. The host 400 may further include a component 300. The component 300 is received in the receiving space 10a and fixed by the accommodating device 100. The component 300 may be a solid state drive, a hybrid hard drive, a hard disk drive, or a CD-ROM driver.

Figure 10:
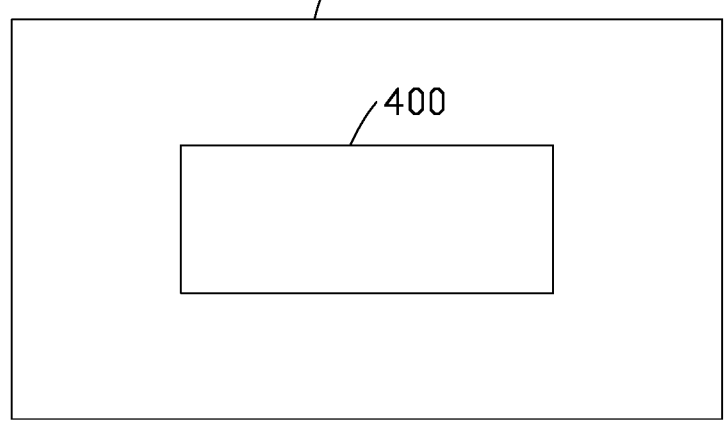
FIG. 10 is a schematic diagram illustrating a data processing equipment according to an embodiment of the present disclosure.

Referring to FIG. 10, the host 400 may be applied in a data processing equipment 500 to perform data processing.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. An accommodating device, comprising:
   a housing defining a receiving space for receiving a component;
   two sliding locks arranged at intervals in the receiving space in a first direction, wherein at least one of the two sliding locks comprises a stopper for being inserted into the component, each of the two sliding locks is slidably connected to the housing to realize the two sliding locks approaching each other to insert the stopper into the component to fix the component or moving away from each other in the first direction to release the component; and
   a rotary lock connected to the two sliding locks and configured to fix positions of the two sliding locks.

2. The accommodating device of claim 1, wherein each of the two sliding locks comprises a first portion, the stopper is connected to the first portion, at least one first through hole is provided on the first portion, the housing comprises a bottom wall to carry the two sliding locks, a first protrusion corresponding to the at least one first through hole is provided on the bottom wall, the at least one first through hole slidably receives the first protrusion and the first portion is slidably connected to the bottom wall to realize the first protrusion sliding in the at least one first through hole along the first direction.

3. The accommodating device of claim 2, wherein the housing further comprises two side walls connected to the bottom wall at intervals in the first direction, a first opening penetrates each of the two side walls along the first direction, each of the two sliding locks further comprises a second portion, the second portions are configured to drive the two sliding locks to move toward or away from each other by sliding back and forth through the first opening.

4. The accommodating device of claim 3, wherein the rotary lock comprises a rotary portion and a positioning portion, the rotary portion is rotatably connected to the bottom wall and slidably connected to the first portion, the positioning portion is fixedly connected to the bottom wall, a first recess and a second recess are respectively recessed inwardly from a side of the positioning portion facing the rotary portion, the first recess and the second recess are arranged at intervals in the first direction, the rotary portion comprises a second protrusion, the second protrusion is configured to be received in the first recess or the second recess to fix the positions of the two sliding locks when the two sliding locks slide.

5. The accommodating device of claim 4, wherein a second through hole is provided on the first portion of each of the two sliding locks, the second through hole extends along an extending direction inclined relative to the first direction, the rotary portion further comprises two limiting protrusions, each of the two limiting protrusions is slidably received in the second through hole of one of the two sliding locks, the two limiting protrusions are configured to drive the rotary portion to rotate when being driven by the two sliding locks to slide in the second through holes along the extending direction.

6. The accommodating device of claim 4, wherein the rotary portion further comprises a connecting part and an elastic part, the connecting part is rotatably connected to the bottom wall, the elastic part is connected to a side of the connecting part facing the positioning portion, the second protrusion is connected to a side of the elastic part facing the positioning portion.

7. The accommodating device of claim 6, wherein a gap is provided between the connecting part and the elastic part.

8. A host comprising:
a cabinet; and
an accommodating device received in the cabinet, the accommodating device comprising:
  a housing defining a receiving space for receiving a component;
  two sliding locks arranged at intervals in the receiving space in a first direction, wherein at least one of the two sliding locks comprises a stopper for being inserted into the component, each of the two sliding locks is slidably connected to the housing to realize the two sliding locks approaching each other to insert the stopper into the component to fix the component or moving away from each other in the first direction to release the component; and
  a rotary lock connected to the two sliding locks and configured to fix positions of the two sliding locks.

9. The host of claim 8, wherein each of the two sliding locks comprises a first portion, the stopper is connected to the first portion, at least one first through hole is provided on the first portion, the housing comprises a bottom wall to carry the two sliding locks, a first protrusion corresponding to the at least one first through hole is provided on the bottom wall, the at least one first through hole slidably receives the first protrusion and the first portion is slidably connected to the bottom wall to realize the first protrusion sliding in the at least one first through hole along the first direction.

10. The host of claim 9, wherein the housing further comprises two side walls connected to the bottom wall at intervals in the first direction, a first opening penetrates each of the two side walls along the first direction, each of the two sliding locks further comprises a second portion, the second portions are configured to drive the two sliding locks to move toward or away from each other by sliding back and forth through the first opening.

11. The host of claim 10, wherein the rotary lock comprises a rotary portion and a positioning portion, the rotary portion is rotatably connected to the bottom wall and slidably connected to the first portion, the positioning portion is fixedly connected to the bottom wall, a first recess and a second recess are respectively recessed inwardly from a side of the positioning portion facing the rotary portion, the first recess and the second recess are arranged at intervals in the first direction, the rotary portion comprises a second protrusion, the second protrusion is configured to be received in the first recess or the second recess to fix the positions of the two sliding locks when the two sliding locks slide.

12. The host of claim 11, wherein a second through hole is provided on the first portion of each of the two sliding locks, the second through hole extends along an extending direction inclined relative to the first direction, the rotary portion further comprises two limiting protrusions, each of the two limiting protrusions is slidably received in the second through hole of one of the two sliding locks, the two limiting protrusions are configured to drive the rotary portion to rotate when being driven by the two sliding locks to slide in the second through holes along the extending direction.

13. The host of claim 11, wherein the rotary portion further comprises a connecting part and an elastic part, the connecting part is rotatably connected to the bottom wall, the elastic part is connected to a side of the connecting part facing the positioning portion, the second protrusion is connected to a side of the elastic part facing the positioning portion.

14. The host of claim 13, wherein a gap is provided between the connecting part and the elastic part.

15. A data processing equipment comprising:
a host performing data processing comprising:
  a cabinet; and
  an accommodating device received in the cabinet, the accommodating device comprising:
    a housing defining a receiving space for receiving a component;
    two sliding locks arranged at intervals in the receiving space in a first direction, wherein at least one of the two sliding locks comprises a stopper for being inserted into the component, each of the two sliding locks is slidably connected to the housing to realize the two sliding locks approaching each other to insert the stopper into the component to fix the component or moving away from each other in the first direction to release the component; and
    a rotary lock connected to the two sliding locks and configured to fix positions of the two sliding locks.

16. The data processing equipment of claim 15, wherein each of the two sliding locks comprises a first portion, the stopper is connected to the first portion, at least one first through hole is provided on the first portion, the housing comprises a bottom wall to carry the two sliding locks, a first protrusion corresponding to the at least one first through hole is provided on the bottom wall, the at least one first through hole slidably receives the first protrusion and the first portion is slidably connected to the bottom wall to realize the first protrusion sliding in the at least one first through hole along the first direction.

17. The data processing equipment of claim 16, wherein the housing further comprises two side walls connected to the bottom wall at intervals in the first direction, a first opening penetrates each of the side walls along the first direction, each of the two sliding locks further comprises a second portion, the second portions are configured to drive the two sliding locks to move toward or away from each other by sliding back and forth through the first opening.

18. The data processing equipment of claim 17, wherein the rotary lock comprises a rotary portion and a positioning portion, the rotary portion is rotatably connected to the bottom wall and slidably connected to the first portion, the positioning portion is fixedly connected to the bottom wall, a first recess and a second recess are respectively recessed inwardly from a side of the positioning portion facing the rotary portion, the first recess and the second recess are arranged at intervals in the first direction, the rotary portion comprises a second protrusion, the second protrusion is configured to be received in the first recess or the second recess to fix the positions of the two sliding locks when the two sliding locks slide.

19. The data processing equipment of claim 18, wherein a second through hole is provided on the first portion of each of the two sliding locks, the second through hole extends along an extending direction inclined relative to the first direction, the rotary portion further comprises two limiting protrusions, each of the two limiting protrusions is slidably received in the second through hole of one of the two sliding locks, the two limiting protrusions are configured to drive the rotary portion to rotate when being driven by the two sliding locks to slide in the second through holes along the extending direction.

20. The data processing equipment of claim 18, wherein the rotary portion further comprises a connecting part and an elastic part, the connecting part is rotatably connected to the bottom wall, the elastic part is connected to a side of the connecting part facing the positioning portion, the second protrusion is connected to a side of the elastic part facing the positioning portion.

* * * * *